United States Patent
Kurosawa et al.

(10) Patent No.: US 6,671,069 B1
(45) Date of Patent: Dec. 30, 2003

(54) IMAGE PROCESSING APPARATUS AND METHOD AND IMAGE PROCESSING SYSTEM

(75) Inventors: Yuji Kurosawa, Kashiwa (JP); Akihiro Yoshitani, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/409,054

(22) Filed: Sep. 30, 1999

(30) Foreign Application Priority Data

Oct. 2, 1998 (JP) .......................................... 10-281612

(51) Int. Cl.⁷ ................................................. H04N 1/00
(52) U.S. Cl. ......................... 358/1.9; 358/434; 358/473; 382/313
(58) Field of Search ................................. 358/473, 434, 358/435, 436, 438, 439, 474, 1.9; 382/313

(56) References Cited

U.S. PATENT DOCUMENTS 5,387,984 A * 2/1995 Nakatani et al. ............ 358/439
5,418,630 A * 5/1995 Mori et al. .................. 358/472

FOREIGN PATENT DOCUMENTS

JP 7-110030 11/1995

* cited by examiner

Primary Examiner—Thomas D. Lee
(74) Attorney, Agent, or Firm—Fitzpatrick, Cella, Harper & Scinto

(57) ABSTRACT

When a detachable image reader can scan both color and monochrome images, the read images are transferred and printed in the scanning order. A printing output is undesirably limited depending on the type of printing agent cartridge of a main body printer. An object of this invention is to solve this problem. When a hand scanner unit scans and stores color and monochrome images, and mounted on a main body reader, a printing agent cartridge in the printer is identified. If the cartridge is a color one, color images in the hand scanner unit are preferentially transferred and printed out by the printer. Then, a change to a monochrome cartridge is displayed on a display. After the cartridge is changed, monochrome images in the hand scanner unit are transferred and printed out by the printer.

40 Claims, 14 Drawing Sheets

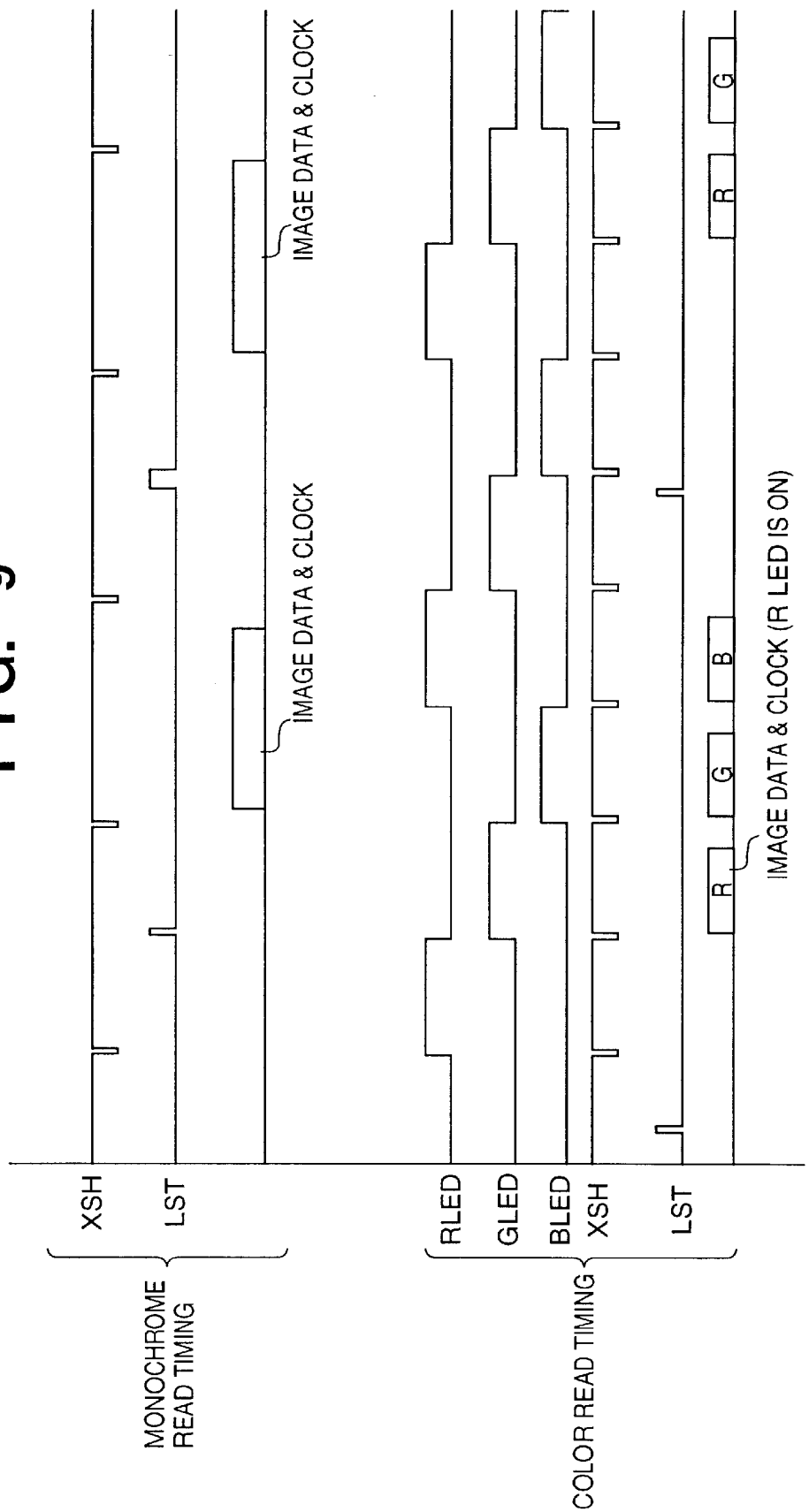

F I G. 10A

| | OPERATION | FLOW OF IMAGE SIGNAL | | | | |
|---|---|---|---|---|---|---|
| (a) | COLOR READ IN MANUAL SCANNING | 58 (CS) <br> 52 (MEMORY) | →57 (A/D CONVERSION) →53 (CPU) | →60 (SERIAL MULTILEVEL) →62 (MEMORY) | →56 (SERIAL/ PARALLEL) | →51 (MEMORY) ↑ |
| (b) | MONOCHROME PHOTOGRAPH READ IN MANUAL SCANNING | 58 (CS) <br> 52 (MEMORY) | →57 (A/D CONVERSION) →53 (CPU) | →60 (SERIAL MULTILEVEL) →62 (MEMORY) | →56 (SERIAL/ PARALLEL) | →51 (MEMORY) ↑ |
| (c) | MONOCHROME CHARACTER READ IN MANUAL SCANNING | 58 (CS) <br> 53 (CPU) | →57 (A/D CONVERSION, BINARIZATION) →62 (MEMORY) | →60 (SERIAL BINARY) | →56 (SERIAL/ PARALLEL) | →51 (MEMORY) ↑ |
| (d) | COLOR COPYING AFTER MOUNTING | 62 (MEMORY) <br> 61 | →53 (CPU) →57 (BINARIZATION) | →52 (MEMORY) →60 | →51 (MEMORY) →59 | →56 (PARALLEL/ SERIAL) ↑ →TO FAX MAIN BODY |
| (e) | COLOR TRANSMISSION AFTER MOUNTING (JPEG) | 62 (MEMORY) <br> 59 | →56 (PARALLEL/ SERIAL) →TO FAX MAIN BODY | →52 (MEMORY) | →TO FAX MAIN BODY | |
| (f) | MONOCHROME PHOTOGRAPH COPYING AFTER MOUNTING | 62 (MEMORY) <br> 61 | →53 (CPU) →57 (BINARIZATION) | →52 (MEMORY) →60 | →51 (MEMORY) →59 | →56 (PARALLEL/ SERIAL) ↑ →TO FAX MAIN BODY |
| (g) | MONOCHROME PHOTOGRAPH TRANSMISSION AFTER MOUNTING | 62 (MEMORY) <br> 59 | →53 (CPU) →TO FAX MAIN BODY | →52 (MEMORY) | →51 (MEMORY) | →56 (SERIAL/ PARALLEL) ↑ |
| (h) | MONOCHROME CHARACTER COPYING AFTER MOUNTING | 62 (MEMORY) <br> TO FAX MAIN BODY | →53 (CPU) | →51 (MEMORY) | →56 (PARALLEL/ SERIAL) | →59 ↑ |
| (i) | MONOCHROME CHARACTER TRANSMISSION AFTER MOUNTING | 62 (MEMORY) <br> TO FAX MAIN BODY | →53 (CPU) | →51 (MEMORY) | →56 (PARALLEL/ SERIAL) | →59 ↑ |

FIG. 10B

| | OPERATION | FLOW OF IMAGE SIGNAL |
|---|---|---|
| (j) | COLOR COPYING IN SHEET-THROUGH READ | 58 (CS) → 57 (A/D CONVERSION) → 59 ↑<br>TO FAX MAIN BODY |
| (k) | COLOR TRANSMISSION IN SHEET-THROUGH READ (JPEG) | 58 (CS) → 57 (A/D CONVERSION) → 60 → 56 (SERIAL/PARALLEL) → 51 (MEMORY) ↑<br>52 (MEMORY) → 53 (CPU) → 62 (MEMORY) → 56 (PARALLEL/SERIAL) → 59 ↑<br>TO FAX MAIN BODY |
| (l) | MONOCHROME PHOTOGRAPH COPYING IN SHEET-THROUGH READ | 58 (CS) → 57 (A/D CONVERSION) → 57 (BINARIZATION) → 60 → 59 ↑ |
| (m) | MONOCHROME PHOTOGRAPH TRANSMISSION IN SHEET-THROUGH READ | 58 (CS) → 57 (A/D CONVERSION) → 57 (BINARIZATION) → 60 → 59 ↑<br>TO FAX MAIN BODY |
| (n) | MONOCHROME CHARACTER COPYING IN SHEET-THROUGH READ | 58 (CS) → 57 (A/D CONVERSION) → 57 (BINARIZATION) → 60 → 59 ↑<br>TO FAX MAIN BODY |
| (o) | MONOCHROME CHARACTER TRANSMISSION IN SHEET-THROUGH READ | 58 (CS) → 57 (A/D CONVERSION) → 57 (BINARIZATION) → 60 → 59 ↑<br>TO FAX MAIN BODY |

IMAGE PROCESSING APPARATUS AND METHOD AND IMAGE PROCESSING SYSTEM

BACKGROUND OF THE INVENTION

1. Field of the Invention

The present invention relates to an image processing apparatus and method and image processing system and, more particularly, to an image processing apparatus and method and image processing system for reading an image by a detachable reader unit and printing out the image onto a printing medium.

2. Description of the Related Art

Image data transmission apparatuses such as a facsimile apparatus having a detachable hand scanner mounted in a main body have conventionally been known. In such apparatus, as disclosed in, e.g., Japanese Patent Publication No. 7-110030, a plurality of images are read by the hand scanner in advance. After the hand scanner is mounted in the main body, the read image data are sequentially transferred to the main body and printed out onto a printing medium. At this time, a plurality of image data read by the hand scanner are generally transferred to the main body in the scanning order. For example, images A, B, and C are sequentially read by the hand scanner, and transferred to the main body in this order. The printer on the main body also sequentially prints out the images A, B, and C onto a printing medium in accordance with the transfer order.

In the conventional facsimile apparatus, when both scanning and printing images are monochrome binary images, a plurality of images scanned by the hand scanner can be printed out in the scanning order without any problem.

However, with recent development of image processing apparatuses, color facsimile apparatuses capable of transmitting color images are becoming popular. In general, such color facsimile apparatus can transfer not only color images but also monochrome images.

When a detachable hand scanner is applied to this color facsimile apparatus, the hand scanner can scan and store both color and monochrome images, and the main body printer can print out both color and monochrome images. In an inkjet printer for printing an image by discharging ink from a printer capable of color printing, either one of a color cartridge filled with color inks and a monochrome cartridge filled with a black ink is often appropriately mounted in accordance with an output image.

In this color facsimile apparatus, for example, a user scans a monochrome image after scanning a plurality of color images with the hand scanner, and mounts the hand scanner on the main body to start printing. At this time, if the monochrome cartridge is mounted in the main body printer, the user must exchange the monochrome cartridge of the printer with the color cartridge to start printing because the color images were first scanned by the hand scanner. After the plurality of color images are printed out, the user must mount the monochrome cartridge again to finally print out the read monochrome image. In some cases, color and monochrome images are alternately stored depending on the scanning order by the hand scanner. In this case, cartridge exchange in printing is very cumbersome.

If the user has only the monochrome cartridge, not only a color image scanned first, but also a monochrome image scanned next cannot be output.

SUMMARY OF THE INVENTION

The present invention has been made to overcome the conventional drawbacks, and has as its object to provide an image processing apparatus and method and image processing system capable of efficiently printing out an image regardless of the type of printing agent cartridge mounted in a main body printer when a detachable image reader can scan both color and monochrome images.

It is another object of the present invention to provide an image processing apparatus and method and image processing system for minimizing the frequency of exchanging the printing agent cartridge.

As a means for achieving the above objects, an image processing apparatus according to the present invention comprises the following arrangement.

That is, an image processing apparatus having image reading means for reading an image by a detachable reading unit, and image printing means for printing out the image read by the image reading means onto a printing medium, comprises printing agent detecting means for detecting information relating to printing agent used in the image printing means, and control means for controlling transfer of the image read by the image reading means to the image printing means in accordance with the information relating to printing agent.

In addition, an image processing apparatus comprises image reading means for reading an image by a detachable reading unit, and image printing means for printing out the transferred image read by the image reading means onto a printing medium, the image reading means having printing agent detecting means for detecting information relating to printing agent used in the image printing means, and control means for controlling image transfer to the image printing means in accordance with the information relating to printing agent detected by the printing agent detecting means.

It is still another object of the present invention to provide a detachable image capturing device having a new function.

To achieve the above object, according to the present invention, there is provided an image processing apparatus, which is capable of communicating with and is detachable from an external apparatus having an image processing function, comprising: image capturing means for capturing an image object and generating image data; encoding means for encoding the image data in order to reduce the amount of the image data; and transmitting means for transmitting the encoded image data to the external apparatus. Also, there is provided a image processing apparatus, which is capable of communicating with and is detachable from an external apparatus having an image printing function, comprising: image capturing means for capturing an image object and generating image data; receiving means for receiving the status of the image printing function from the external apparatus; and transmitting means for transmitting the image data based on the status from the external apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a timing chart showing a read timing in the hand scanner unit;

FIG. 10A is a table showing the flow of an image signal in the hand scanner unit;

FIG. 10B is a table showing the flow of an image signal in the hand scanner unit;

DETAILED DESCRIPTION OF THE PREFERRED EMBODIMENTS

Preferred embodiments of the present invention will be described in detail below with reference to the accompanying drawings.

First Embodiment
[Arrangement of Facsimile Apparatus]

Figure 1:
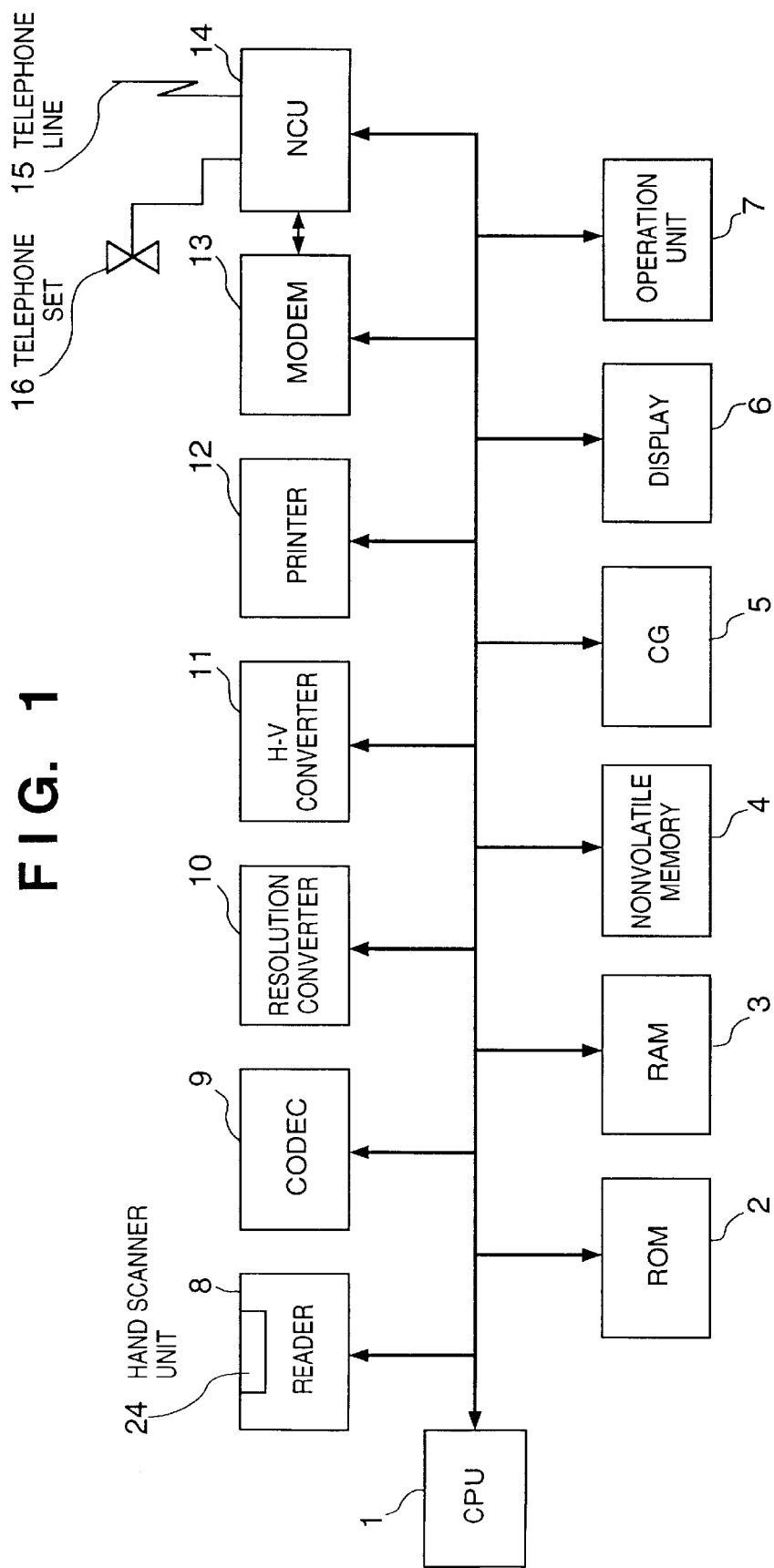
FIG. 1 is a block diagram showing the arrangement of a facsimile apparatus according to the first embodiment of the present invention.

FIG. 1 is a block diagram showing the arrangement of a facsimile apparatus according to the first embodiment. In FIG. 1, reference numeral 1 denotes a CPU which is comprised of a microprocessor and the like, and controls a RAM 3, nonvolatile RAM 4, character generator (CG) 5, reader 8, printer 12, operation unit 7, display 6, CODEC unit 9, resolution converter 10, H/V converter 11, MODEM unit 13, and NCU unit 14 in accordance with programs stored in a ROM 2.

The RAM 3 stores binary image data and color image data read by the reader 8, or printing image data to be printed by the printer 12 on a printing medium. Further, the RAM 3 stores transmission encoded image data to be output to the MODEM unit 13, and received encoded image data input from the MODEM unit 13. The nonvolatile RAM 4 holds data such as an abbreviated dialing number which should be stored even if the power supply is turned off.

The CG 5 is a ROM storing characters such as JIS and ASCII codes, and extracts character data corresponding to a predetermined code on the basis of the control of the CPU 1 as needed.

The display 6 is made up of an LED, LCD module as a combination of a timepiece display 7-segment LCD, icon LCD for displaying various modes, and dot matrix LCD capable of displaying 16 characters (each having 5×7 dots)×1 line, and the like. The display 6 can display various information such as modes (to be described later). The operation unit 7 comprises an image transmission/reception start key, mode selection key for selecting an operation mode such as a transmission/reception resolution, dialing ten-key pad and one-touch keys, and the like.

The reader 8 is made up of a DMA controller, image processing IC, image sensor, CMOS logic IC, and the like. The reader 8 processes an image signal read using an image sensor such as a contact image sensor (CS) in the image processing IC on the basis of the control of the CPU 1 to finally transfer the processed data to the RAM 3. The setting state of an original on the reader 8 can be detected by interposing an original detector using a photosensor on an original convey path. The image sensor in the first embodiment is integrated with a rotary encoder, and detachably mounted as a cordless hand scanner unit 24 on the reader 8. Whether the hand scanner unit 24 is mounted on the reader 8 can be detected by both the hand scanner unit 24 and main body CPU 1, as will be described later.

The CODEC unit 9 is constituted by hardware, and performs processing of decoding received encoded data, and encoding transmission image data read by the reader 8 under the control of the CPU 1 at high speed. The CODEC unit 9 is made up of a circuit of converting read raw data to an RL (Run Length) code, circuit of converting an RL code to raw data, and the like. Note that the facsimile apparatus in the first embodiment uses MH, MR, or MMR codes.

The resolution converter 10 converts binary raw data which is read by the reader 8 and stored in the RAM 3, or raw data decoded from received encoded data which is received via the MODEM unit 13 and stored in the RAM 3, from 8 pels (8 pixels/mm) as the resolution of this facsimile apparatus to 360 dpi (360 dots/inch) as the printing resolution of the printer 12. The resolution converter 10 converts the resolution in only the main scanning direction of image data by hardware, and stores the converted data in the RAM 3. The resolution converter 10 performs software line copying for the data in the RAM 3 under the control of the CPU 1 to convert the resolution in the subscanning direction.

The H/V converter 11 performs horizontal-to-vertical conversion (H/V conversion) for image data. In the H/V converter 11, data in the main scanning direction corresponding to the horizontal direction of image data are prepared by the same number a of lines as the number a of nozzles of an inkjet head in the printer. To obtain data to be supplied to a necessary head in actual printing, a data of identical dots on respective lines are extracted in the subscanning direction, and rearranged in the data supply order to the head.

The printer 12 is made up of a DMA controller, inkjet printer, CMOS logic IC, and the like. The printer 12 extracts printing data stored in the RAM 3 under the control of the CPU 1 to print out the data onto a printing sheet by the inkjet printer.

The MODEM unit 13 is made up of a G3 modem, clock generator connected to it, and the like. The MODEM unit 13 modulates encoded transmission data stored in the RAM 3, and outputs the modulated data to a telephone line 15 via the NCU unit 14. The MODEM unit 13 receives an analog signal from the telephone line 15 via the NCU unit 14, demodulates the signal, and stores the received encoded data in the RAM 3. The NCU unit 14 switches the telephone line 15 between the MODEM unit 13 and telephone set 16 to connect the telephone line 15 to the selected one under the control of the CPU 1. The NCU unit 14 has a means for detecting a call signal (CI), and when a call signal is detected, transmits a terminating signal to the CPU 1. The telephone set 16 is integrated with the facsimile apparatus, and made up of a handset, speech network, dialer, ten-key pad and one-touch keys, and the like.

[Structure of Inkjet Printer]

Figure 2:
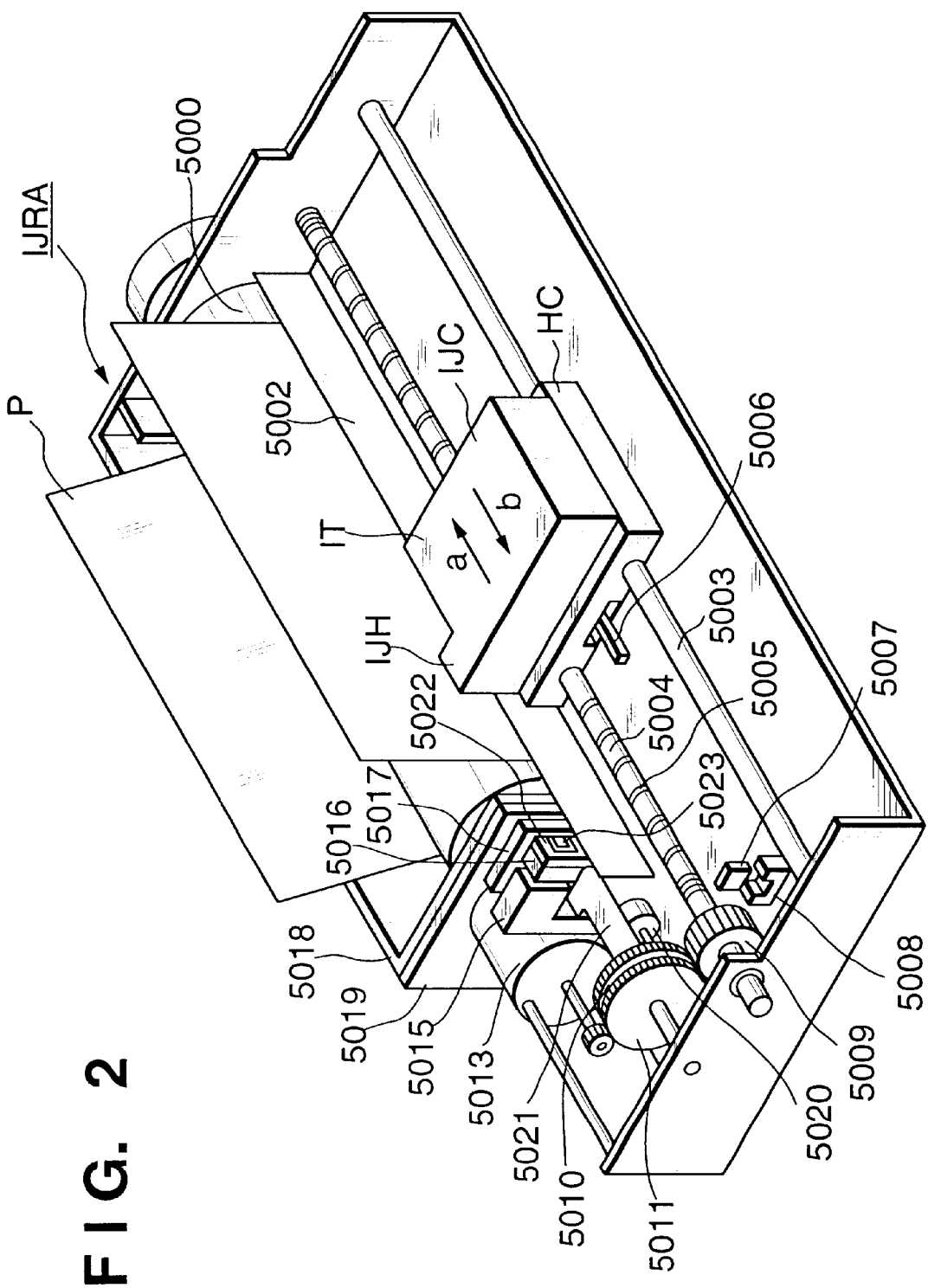
FIG. 2 is a perspective view showing the outer appearance of an inkjet printer in the first embodiment.

FIG. 2 is a perspective view schematically showing the outer appearance of an inkjet printer IJRA constituting the printer 12 in the first embodiment. In FIG. 2, a pin (not shown) is attached to a carriage HC engaging with a helical groove 5004 of a lead screw 5005 which rotates via driving force transfer gears 5009 to 5011 while interlocking with forward/reverse rotation of a driving motor 5013. The carriage HC is supported by a guide rail 5003 to reciprocate in the directions of arrows a and b. An integral ink cartridge IJC incorporating a printhead IJH and ink tank IT is mounted in the carriage HC. Reference numeral 5002 denotes a sheet press plate for pressing a printing sheet P against a platen 5000 in the moving direction of the carriage HC; 5007 and 5008, photocouplers serving as home position detectors for detecting the presence of a carriage lever 5006 in a corresponding region and switching the rotational direction of the motor 5013; 5016, a member for supporting a cap 5022 which caps the front end of the printhead IJH; 5015, a suction unit which evacuates the interior of the cap and performs suction recovery of the printhead via an intra-cap opening 5023; 5017, a cleaning blade; and 5019, a member capable of moving this blade back and forth. The cleaning blade 5017 and member 5019 are supported by a main body support plate 5018. The blade is not limited to this, and a known cleaning blade can be applied to the present invention. Reference numeral 5021 denotes a lever which starts suction for suction recovery, and moves along with movement of a cam 5020 engaging the carriage. A driving force from the driving motor is controlled for movement by a known transmission mechanism such as a clutch switching mechanism.

Capping, cleaning, and suction recovery are executed by desired processes at corresponding positions by operation of the lead screw 5005 when the carriage comes to the home-position region. However, any processes can be applied to the present invention so long as desired operations are done at known timings.

A control configuration for executing printing control of the above inkjet printer IJRA will be described.

Figure 3:
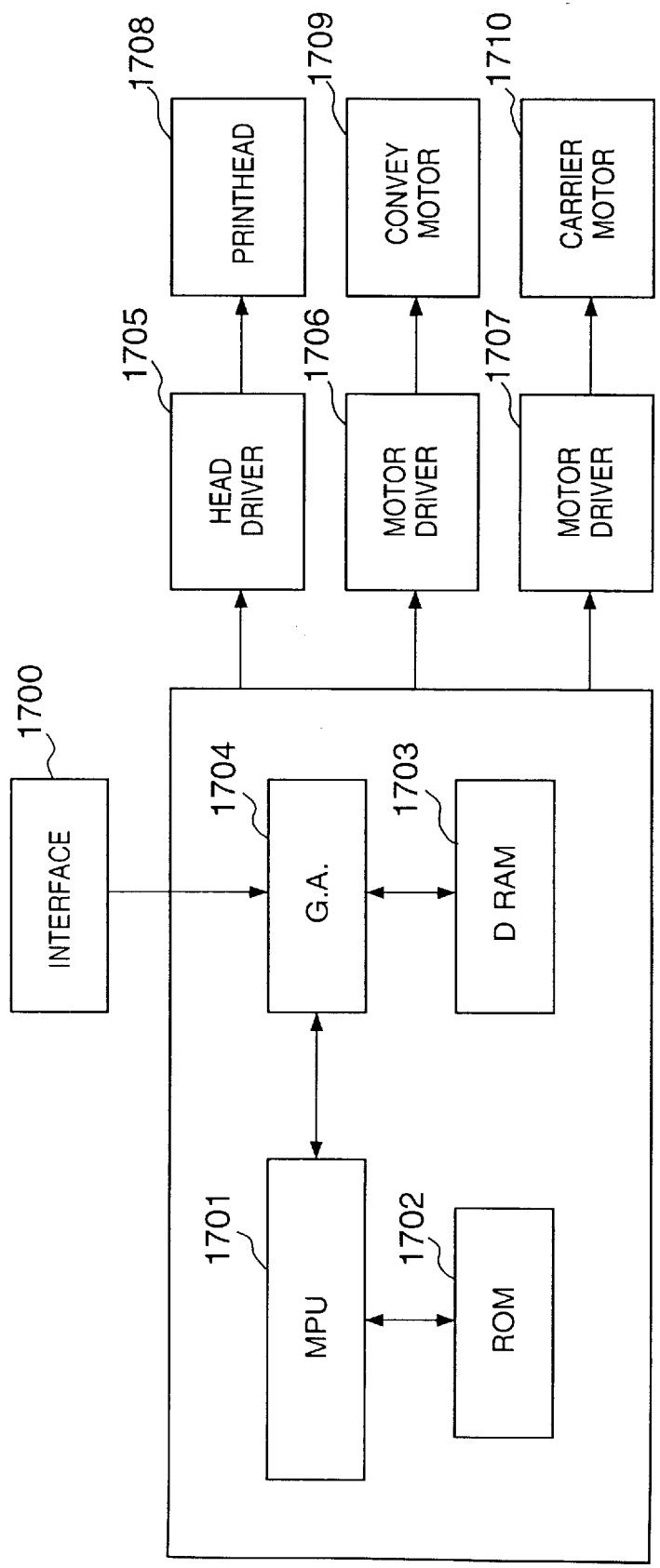
FIG. 3 is a block diagram showing the arrangement of the control circuit of the inkjet printer.

FIG. 3 is a block diagram showing the arrangement of the control circuit of the inkjet printer IJRA. In FIG. 3 showing the control circuit, reference numeral 1700 denotes an interface for inputting a printing signal from the H/V converter 11; 1701, an MPU; 1702, a ROM storing a control program executed by the MPU 1701; 1703, a DRAM storing various data (the printing signal, printing data supplied to the head, and the like); 1704, a gate array (G.A.) which controls supply of printing data to a printhead 1708, and also controls data transfer between the interface 1700, MPU 1701, and DRAM 1703; 1710, a carrier motor for carrying the printhead 1708; 1709, a convey motor for conveying a printing sheet; 1705, a head driver for driving the printhead; and 1706 and 1707, motor drivers for respectively driving the convey motor 1709 and carrier motor 1710.

Operation of this control configuration will be explained. When a printing signal is input to the interface 1700, the printing signal is converted into printing data between the gate array 1704 and MPU 1701. Then, the motor drivers 1706 and 1707 are driven, and the printhead is driven in accordance with the printing data sent to the head driver 1705 to print the data.

As described above, the ink tank IT and printhead IJH are integrated into the exchangeable ink cartridge IJC. Alternatively, the ink tank IT and printhead IJH may be separably integrated to exchange only the ink tank IT when ink is used up.

Figure 4:
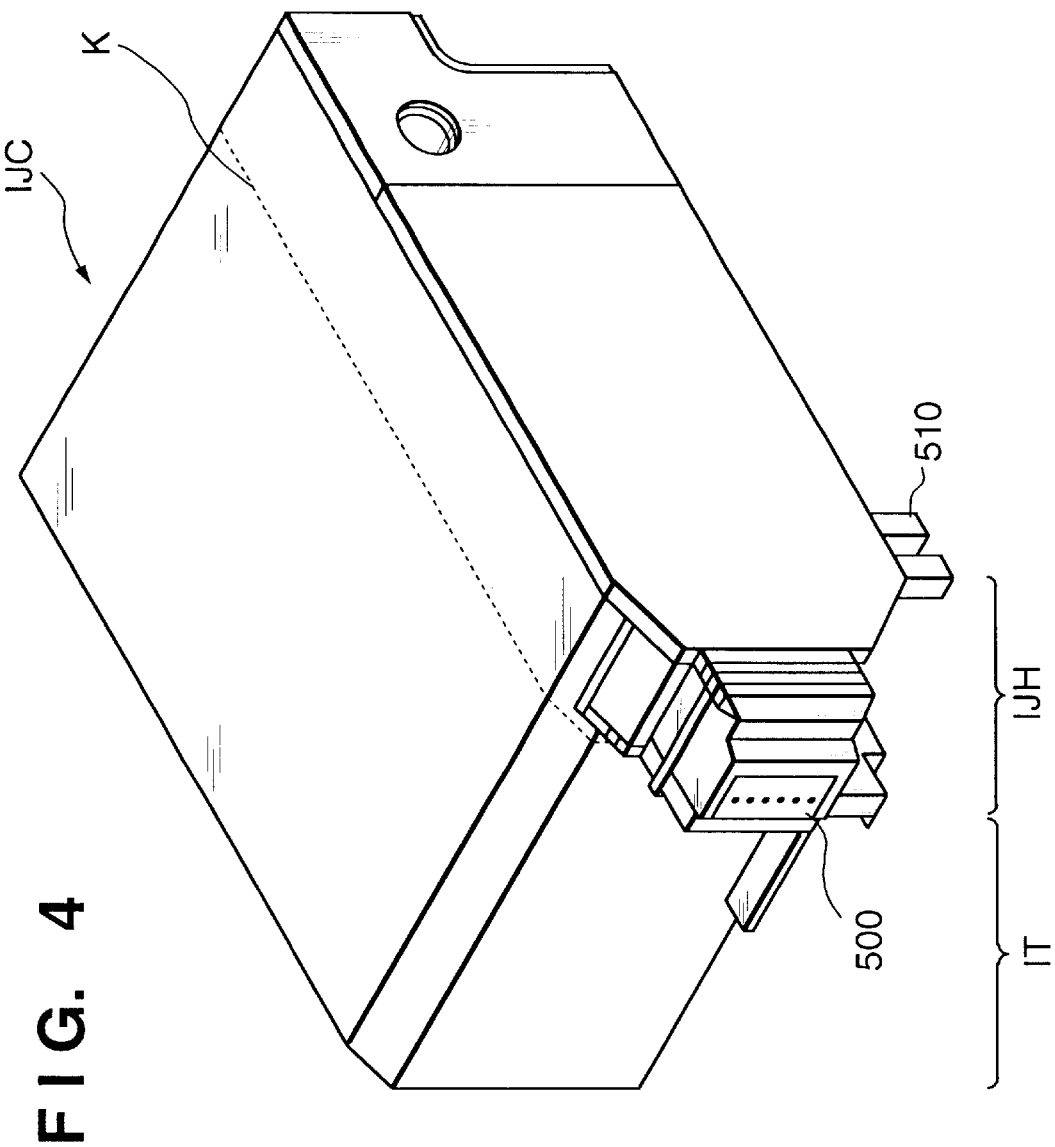
FIG. 4 is a perspective view showing the outer appearance of an ink cartridge.

FIG. 4 is a perspective view showing the outer appearance of an ink cartridge IJC which can be separated into an ink tank IT and printhead IJH. As shown in FIG. 4, the ink cartridge IJC can be separated into the ink tank IT and printhead IJH at a boundary line K. The ink cartridge IJC has an electrode (not shown) for receiving an electrical signal from a carriage HC when the ink cartridge IJC is mounted on the carriage HC. The ink cartridge IJC is driven by the electrical signal to discharge ink, as described above.

Projections 510 projecting from the bottom of the printhead IJH are used to identify the type of ink suitable for the printhead IJH. The number of projections 510 and their positions are set in advance in accordance with, e.g., the ink color of the ink tank IT. When the printhead IJH is mounted on the carriage HC, the projections 510 press corresponding recesses of the carriage HC to allow the CPU 1 of the facsimile apparatus main body to identify the characteristics of the mounted printhead IJH or ink tank IT. The projections 510 may be formed on the ink tank IT side, as a matter of course.

In the first embodiment, ink properties such as the color of ink filled in the ink tank IT can also be identified by directly checking the interior of the ink tank IT or ink itself by, e.g., a photosensor.

In FIG. 4, reference numeral 500 denotes an ink orifice array. The ink tank IT has a fibrous or porous ink absorber in order to hold ink, and the ink absorber holds ink.

In the above arrangement, a liquid droplet discharged from the printhead is ink, and the liquid contained in the ink tank is ink. However, the contained liquid is not limited to ink. For example, the ink tank may contain a processing solution discharged to a printing medium in order to enhance the fixation and water resistance of a printed image or improve the image quality.

[Arrangement of Hand Scanner]

Figure 5:
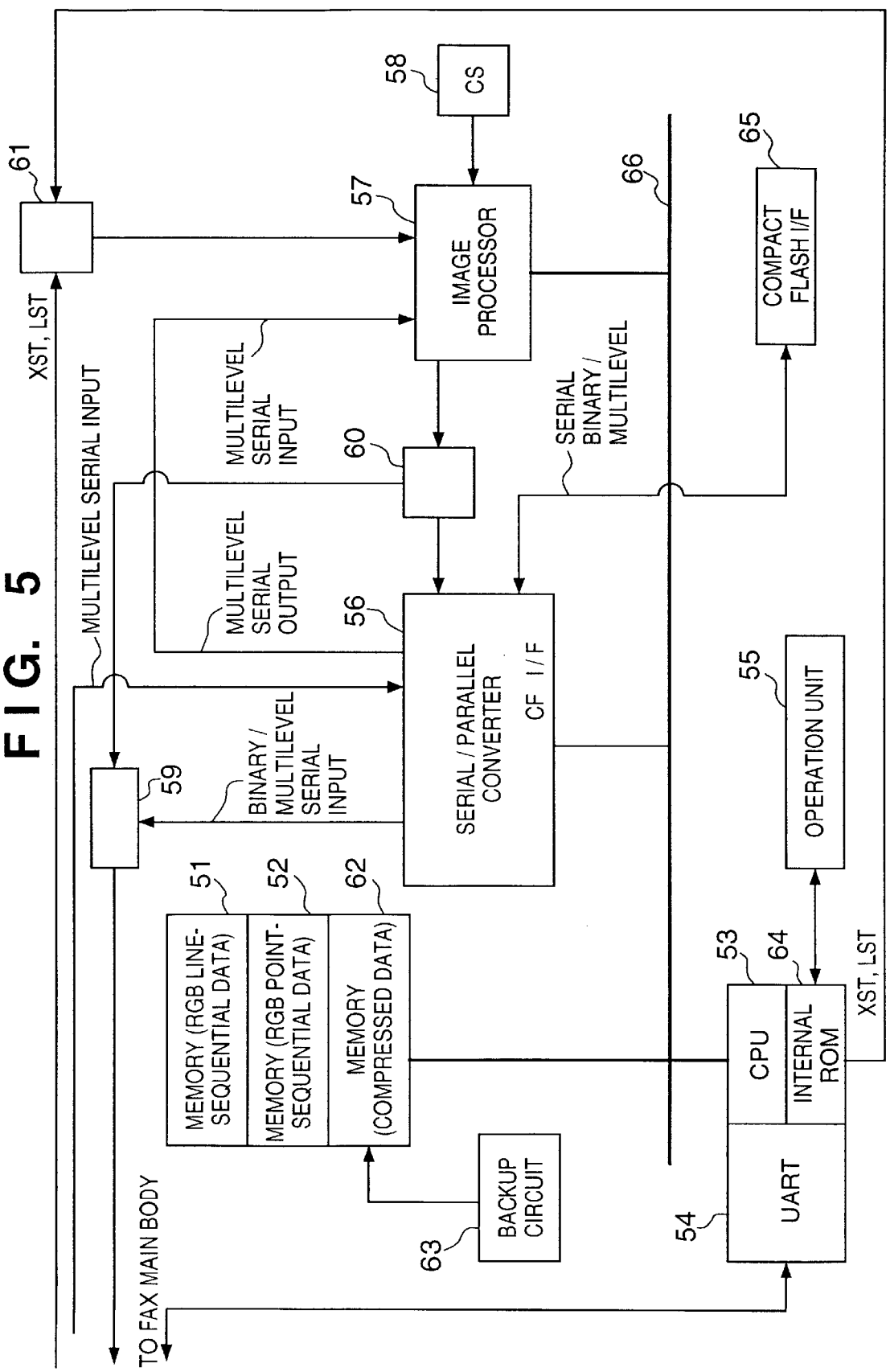
FIG. 5 is a block diagram showing the arrangement of a hand scanner unit in detail.

FIG. 5 is a block diagram showing the hand scanner unit 24 in detail. In FIG. 5, reference numeral 58 denotes a contact line color image sensor (CS) for the facsimile that has red (R), green (G), and blue (B) LED arrays and sequentially turns on the LED arrays of the three colors to obtain RGB data of each line; and 57, an image processor for internally generating a read timing signal for the CS 58 and supplying the signal to the CS 58. Note that an XSH signal at an interval of 2.5 ms representing the read start of one line by the CS 58, and an LST (Line Start) signal for reserving execution/non-execution of an image read of the next line are also supplied from a CPU 53, but are also directly supplied from the facsimile apparatus main body to the CS 58. This is because a UART (Universal Asynchronous Receiver Transmitter) 54 used as an information transmitting means between the main body and hand scanner unit 24 in this embodiment is poor in immediacy. Thus, the XSH and LST signals requiring immediacy are directly supplied from the main body.

An image signal input from the CS 58 is A/D-converted by the image processor 57, and undergoes shading correction, luminance/density gamma conversion, and the like. Either multilevel data after these processes or binary data obtained by binarizing the multilevel data is transmitted as a serial signal to a serial/parallel converter 56 and main body side via a selector 60. The serial/parallel converter 56 is a clocked serial interface which incorporates a serial/parallel converter and parallel/serial converter. The serial/parallel converter 56 internally binarizes a multilevel serial input from the parallel/serial input portion, and transmits the binary data to the facsimile apparatus main body.

The serial/parallel converter 56, the image processor 57, and memories 51, 52, and 62 are connected by a bus 66 to transfer data between them.

The CPU 53 controls the operation of the hand scanner unit 24, and adopts a 32-bit RISC chip. The UART 54 is accessory to the CPU 53 to exchange information with the facsimile apparatus main body. Exchange information includes a setting command for the image processor 57 from the main body, the number of images and read mode information stored in mounting the hand scanner unit 24, and a stored-image erase command from the main body.

Reference numeral 55 denotes an operation unit having various switches, display, and the like. For example, the operation unit 55 comprises a soft power-on/off switch for the hand scanner unit 24, read setting switch for setting, e.g., a color/monochrome read and read resolution, and erase switch for erasing stored images. Further, the operation unit 55 comprises a display made from an LED and the like to display "charging/charging is needed", and a display and speaker for warning a user of a moving speed abnormality during manual scanning by the user.

A rotary encoder has a round molded body in which fine slits are formed. As the hand scanner unit 24 is manually moved, the roller rotates to rotate the molded body with slits attached to the roller. Then, an output from an optical photointerrupter attached to the molded body is output as a pulse via the slits. This pulse is monitored by the CPU 53 to calculate the moving amount of the hand scanner unit 24. When the hand scanner unit 24 is kept separated from the main body, the XSH signal is always transmitted from the CPU 53 at an equal interval, and the CPU 53 adjusts the LST signal so as to coincide with the moving amount of the hand scanner unit 24. If the moving amount of the hand scanner unit 24 is detected to be larger than a predetermined amount on the basis of the output from the rotary encoder, the display and speaker in the operation unit 55 warn the user of this.

The hand scanner unit 24 comprises the memories 51, 52, and 62. The memory 51 stores line-sequential RGB data of one original sent from the CS 58. The memory 51 stores multilevel RGB data when a color image is to be processed (copied/communicated) in the facsimile apparatus, stores multilevel data of only G when a monochrome photograph is to be processed, and stores binary data when a monochrome character is to be processed. The memory 52 is used only when the memory 51 stores multilevel data. The memory 52 stores data prepared by converting multilevel data of the memory 51 into point-sequential data so as to facilitate JPEG compression. This is because software for executing middleware (JPEG compression software) of the CPU 53 corresponds to a VRAM for storing point-sequential data. The memory 62 stores image data compressed by the CPU 53. That is, the memory 62 stores a JPEG code if image data compressed by the CPU 53 is a color or monochrome photograph, and stores MH codes if the data represent a monochrome binary image.

Reference numeral 65 denotes a compact flash I/F made up of a connector and interface circuit to which a compact flash card is inserted. A ROM 64 incorporated in the CPU 53 stores a DOS file manager and compact flash read/write driver as middleware (software group tuned to maximize the processor performance) of the CPU 53. Using the file manager and read/write driver, image data in the compact flash card inserted to the compact flash I/F 65 can be moved to a compressed-data area in the memory 62, whereas data in the memory 62 can be moved to the compact flash card.

Figure 6:
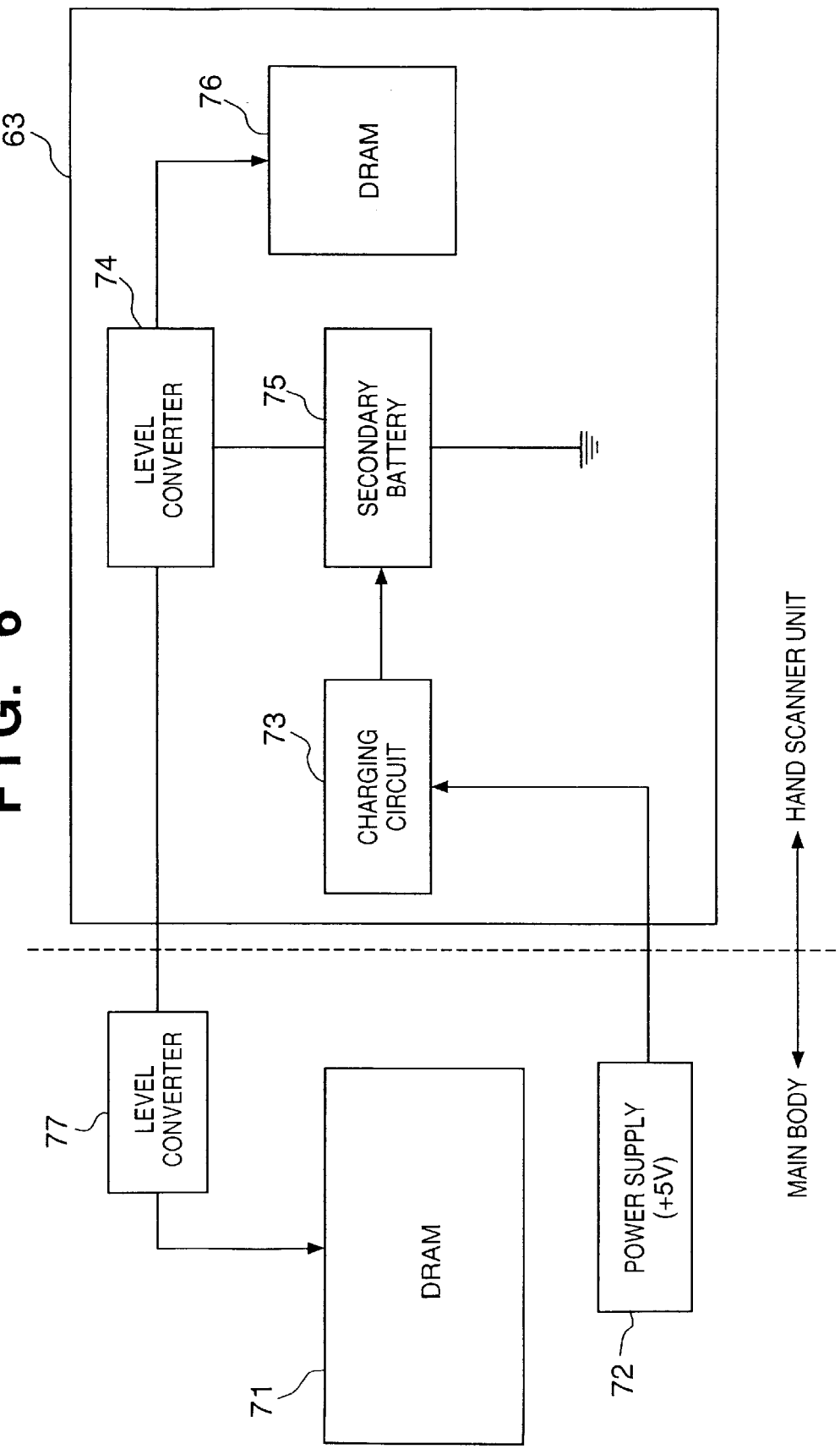
FIG. 6 is a block diagram showing the arrangement of a backup circuit in detail.

Reference numeral 63 denotes a backup circuit for backing up power supply in the hand scanner unit 24. FIG. 6 is a block diagram showing the backup circuit 63 and peripheral circuit. Reference numeral 75 denotes a backup secondary battery such as a nickel-cadmium battery. One cell of the nickel-cadmium battery is at 1.2 V, and a plurality of such cells are series-connected. For example, when three cells are connected, the nickel-cadmium battery provides 3.6 V. This voltage is converted by a level converter 74 into 3.3 V as the power supply voltage of a DRAM 76 to be backed up, and then applied to the DRAM 76. At this time, the DRAM 76 is in a self-refresh mode by the CPU 53. An output from the level converter 74 is sent to the facsimile apparatus main body, boosted to 5 V via a level converter 77 on the main body side, and then supplied to a DRAM 71 of the main body. The output is boosted to 5 V because the main body and DRAM are of a 5-V type. Note that the DRAM 71 corresponds to the RAM 3 shown in FIG. 1. This backup structure enables backing up data in the DRAM 71 for about 10 h even upon sudden power-off. A charging circuit 73 in the backup circuit 63 is formed from a current-limiting circuit for charging the secondary battery 75 based on its charge specification, and receives +5 V from a power supply 72 on the main body side.

[Interface Between Main Body and Unit]

Figure 7:
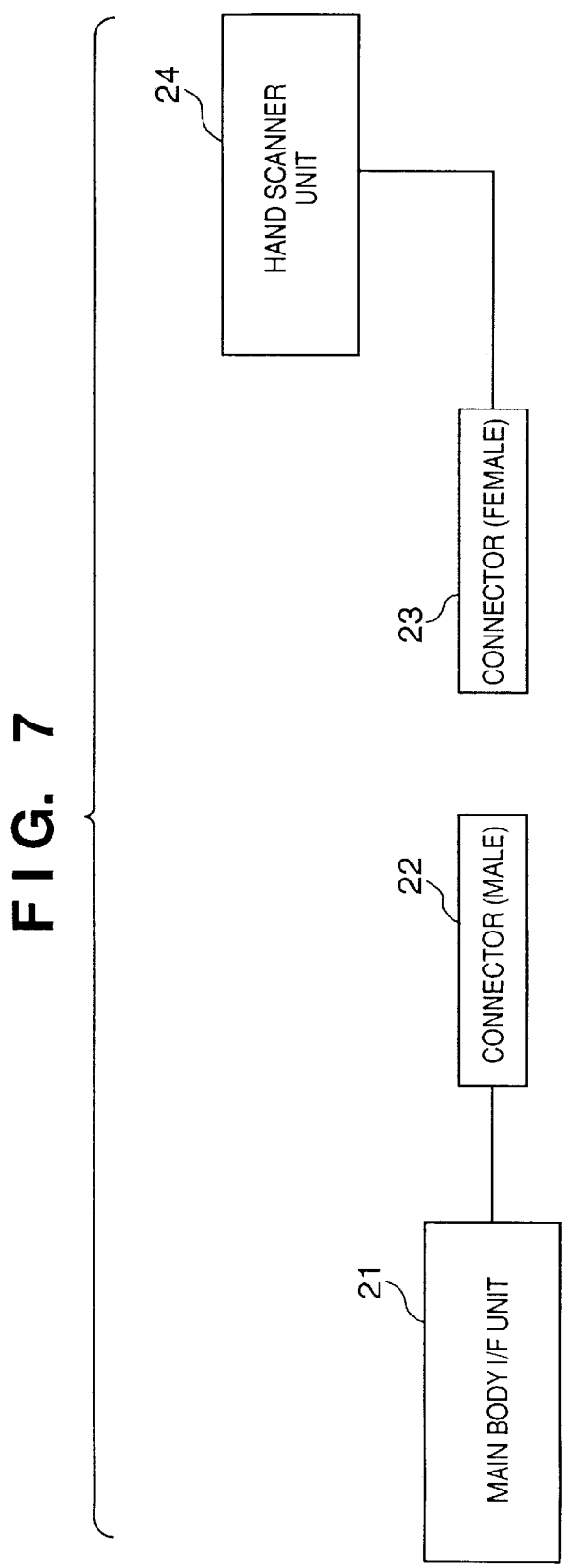
FIG. 7 is a block diagram showing an arrangement for connecting the hand scanner unit to the main body.

FIG. 7 is a block diagram showing the internal arrangement of the reader 8 for connecting the hand scanner unit 24. Reference numeral 21 denotes a main body side I/F unit which is incorporated in the reader 8, and has a function of serial/parallel-converting a serial binary signal or serial image-compressed (e.g., JPEG) signal from the hand scanner unit 24 and DMA-transferring the parallel signal to the RAM 3, a function of parallel/serial-converting compressed (e.g., JPEG compression) data of a received image stored in the RAM 3 and transmitting the serial data to the hand scanner unit 24, and a function of serially exchanging information between the CPU 1 of the main body and the CPU 53 of the hand scanner unit 24; 22, a connector (male) attached to the I/F unit 21; and 23, a connector (female) attached to the hand scanner unit 24 to fit on the connector 22. The connectors 22 and 23 are connected/disconnected to/from each other to connect/disconnect the hand scanner unit 24 to/from the reader 8.

Figure 8:
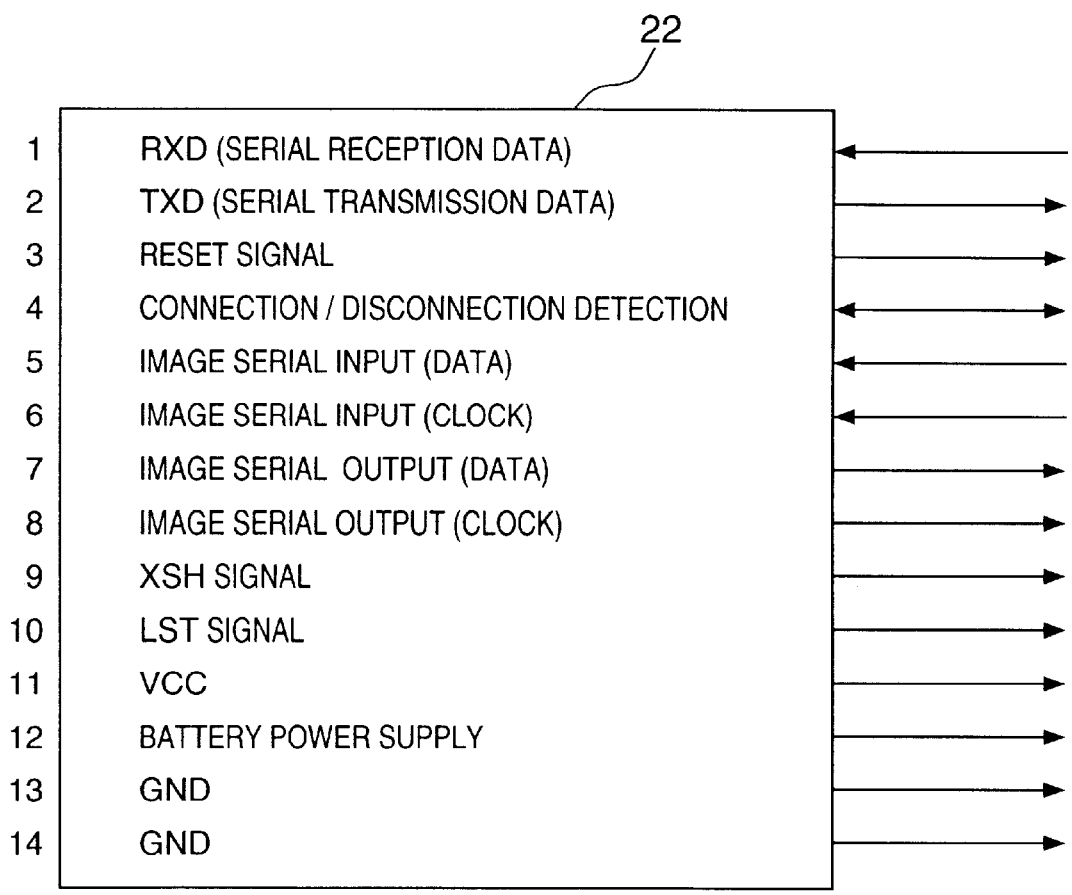
FIG. 8 is a view showing signals for respective pins of a main body connector in detail.

FIG. 8 is a view showing signals for respective pins of the connector 22 connected to the I/F unit 21 in detail. Interface signals between the facsimile apparatus main body and hand scanner unit 24 in the first embodiment will be explained with reference to FIG. 8.

In FIG. 8, the first and second pins respectively correspond to RXD (serial reception data) and TXD (serial transmission data) which are transmission and reception data signals by the UART.

The third pin corresponds to a reset signal. The CPU 1 of the main body transmits the reset signal to hard-reset the CPU 53 of the hand scanner unit 24. As described above, the CPU 1 of the main body exchanges information with the hand scanner unit 24 via the UART. If the CPU 1 does not receive any response for an issued command, the CPU 1 determines any error, and repetitively issues a command. If the CPU 1 finally determines that the hand scanner unit 24 is abnormal, the CPU 1 issues a reset signal to hard-reset the CPU 53. Upon turning on the main body, the CPU 1 also resets the CPU 53.

The fourth pin corresponds to a connection/disconnection detection signal. This signal allows the CPU 1 of the main body to detect connection/disconnection of the hand scanner unit 24. Note that the CPU 53 of the hand scanner unit 24 can also detect connection/disconnection to/from the main body.

The fifth and sixth pins respectively correspond to serial input data and sync clock of image data which are input from the hand scanner unit 24 to the main body in mounting the hand scanner unit 24 on the main body. The seventh and eighth pins respectively correspond to serial output data and clock of image data. The image data is supplied from the main body to the hand scanner unit 24 in order to perform necessary image processing in color reception or the like.

The ninth and 10th pins respectively correspond to an XSH signal and LST signal. The 11th pin corresponds to VCC. The power supply voltage of the main body is applied in mounting the hand scanner unit 24 on the main body. The secondary battery 75 in the backup circuit 63 of the hand scanner unit 24 is also charged via this terminal. The 12th pin corresponds to a battery power supply. Even if the main body is turned off, the RAM 3 can be backed up by the secondary battery 75 in the hand scanner unit 24. The 13th and 14th pins are grounded.

Signals exchanged on the UART 54 will be described. Upon turning on the main body, the CPU 1 of the main body issues a reset command and initialization command for the image processor 57 in the hand scanner unit 24.

When the hand scanner unit 24 is mounted in the main body, the CPU 1 of the main body issues an inquiry command (resolution, color/monochrome read mode, compression method such as JPEG, MR, or DPCM, the number of read pages, and the like) for data stored while the hand scanner unit 24 is disconnected from the main body. Then, the CPU 1 of the main body obtains these data via the UART 54.

When a user designates a stored-data file and page in the hand scanner unit 24 via the operation unit 7, the CPU 1 of the main body designates the file, and issues a copying or transmission command to output a transfer command. The CPU 53 of the hand scanner unit 24 responds "OK" for this command to start transfer operation.

For example, a JPEG-compressed color image is stored in the hand scanner unit 24 by manual scanning. In this case, in transmitting the color image, the CPU 1 can also issue a file designation command and compression method change command so as to transfer the color image after conversion by, e.g., a DPCM compression method in accordance with the ability of a transmission destination apparatus.

In a so-called sheet-through read of automatically reading an original without manually scanning the hand scanner unit 24, the CPU 1 of the main body sets a read mode set by the user with the operation unit 7 for the image processor 57 in the hand scanner unit 24. The CPU 1 issues an LED array ON start command for the CS 58 in the hand scanner unit 24 to the image processor 57. In response to this, the hand scanner unit 24 starts reading an original. Upon completion of the read, the CPU 1 issues an LED array OFF command.

[Read Timing]

FIG. 9 is a timing chart showing a read timing in the hand scanner unit 24. The CS 58 and image processor 57 operate in synchronism with an XSH signal to generate image data and a clock. When an LST signal representing an image read of the next line is input, the CS 58 and image processor 57 perform a read of the next line and image processing to output corresponding image data and a clock. The LST signal is asynchronous from the XSH signal representing the read start of one line in the CS 58. Every time the XSH signal is input, whether the LST signal is input is checked. If the LST signal is input, the CS 58 and image processor 57 execute a read and image processing. In a color read, whether the LST signal is input is checked at the timing of an XSH signal for the R LED.

[Signal Flows in Various Operations]

Various operations in the facsimile apparatus and the flow of an image signal in the hand scanner unit 24 in each operation will be described with reference to FIGS. 10A and 10B.

Manual Scanning

The signal flow in manual scanning by the hand scanner unit 24 will be explained.

(a) When the hand scanner unit 24 is manually scanned in a color read mode, an image signal input from the CS 58 is A/D-converted and subjected to shading correction and luminance/density conversion by the image processor 57. The image signal is input as serial multilevel data to the serial/parallel converter 56 via the selector 60, and stored in the memory 51 by the DMA. This operation is repeated until image signals of one page are stored. Meanwhile, the CPU 53 monitors the movement of the rotary encoder in the operation unit 55, determines whether to read each line in accordance with the signal from the rotary encoder, and controls the image processor 57. Upon completion of a read of one line, the CPU 53 rearranges data stored in the memory 51, and stores the rearranged data in the memory 52. The CPU 53 executes JPEG compression by the incorporated JPEG compression middleware to store the compressed data in the memory 62.

(b) When the hand scanner unit 24 is manually scanned in a monochrome photograph read mode, only multilevel data of G is input instead of RGB data from the CS 58 in the above-described color read mode. In the color read mode, the CS 58 sequentially turns on the R. G, and B LEDs to read one line three times. In the monochrome photograph read mode, the CS 58 turns on only the G LED to read one line. The remaining processing is the same as in (a). The memory 62 stores JPEG-compressed monochrome multilevel data.

(c) When the hand scanner unit 24 is manually scanned in a monochrome character read mode, an image signal input from the CS 58 is A/D-converted, subjected to shading correction and luminance/density conversion, and then subjected to printer processing such as gamma conversion and binarization by the image processor 57. The resultant signal is input as serial binary data to the serial/parallel converter 56 via the selector 60, and stored in the memory 51 by the DMA. After image signals of one page are stored in the memory 51, the CPU 53 executes MH (Modified Huffman) encoding by the incorporated MH middleware to store the compressed data in the memory 62.

Operation After Scanner Unit is Mounted

Each operation upon mounting the hand scanner unit 24 on the main body after manually scanning the hand scanner unit 24 will be described.

In the first embodiment, when the hand scanner unit 24 is mounted on the main body, the CPU 1 of the main body and the CPU 53 of the hand scanner unit 24 detect mounting of the hand scanner unit 24. Communication between the main body and hand scanner unit 24 in this case will be explained.

The CPU 1 of the main body inquires the presence/absence of stored data, the stored-data read mode, and the number of images, of the hand scanner unit 24 via the UART 54. The read mode includes information about a color/monochrome mode in a read, read resolution, and compression method. The CPU 53 of the hand scanner unit 24 responds to this via the UART 54. When the CPU 1 of the main body obtains these pieces of information and detects a copying or transmission request from the operation unit 7, the CPU 1 designates an image file to be processed, and transmits a copying or transmission command to the hand scanner unit 24. Upon reception of this, the CPU 53 of the hand scanner unit 24 converts image data of the designated file into transfer data, and informs the main body after mapping. The CPU 1 of the main body sends an XSH signal and LST signal (image read reservation signal for the next line) at an interval of 2.5 ms to the hand scanner unit 24.

Upon reception of this, the CPU 53 of the hand scanner unit 24 serially stores data of the designated file in the form of data and clock in the RAM 3 of the main body via the I/F unit 21.

The flow of an image signal in the hand scanner unit 24 will be explained.

(d) When color copying is to be executed after the hand scanner unit 24 is mounted on the main body, compressed image data stored in the memory 62 is expanded by JPEG expansion middleware incorporated in the CPU 53, and temporarily stored in the memory 52. The CPU 53 rearranges the stored data, and stores data of one page in the memory 51. At this time, the CPU 53 informs the main body of completion of transfer preparation. The multilevel raw data stored in the memory 51 is parallel/serial-converted by the serial/parallel converter 56 in accordance with an XSH signal and LST signal from the main body, and supplied to the image processor 57. The image processor 57 performs, for the data, shading processing, scanner gamma conversion, and conversion of making only the resolution close to the printer resolution through printer gamma conversion. Thereafter, the image processor 57 binarizes the data to transfer the binary serial data to the main body via the selectors 60 and 59.

On the main body side, the image data transferred via the I/F unit 21 is stored in the RAM 3. The data stored in the RAM 3 is converted at 360 dpi as the printer resolution by the resolution converter 10, and H/V-converted by the H/V converter 11. Then, the data is converted into printing data, and printed on a printing medium by the printer 12.

(e) When color transmission is to be executed after the hand scanner unit 24 is mounted on the main body, the CPU 53 informs the main body via the UART 54 of completion of transfer preparation and the number of transfer bytes. The CPU 53 parallel/serial-converts JPEG-compressed data stored in the memory 62 by the serial/parallel converter 56, and supplies the data to the main body via the selector 59. Upon completion of transfer, the CPU 53 informs the main body via the UART 54 of completion of transfer.

The JPEG-compressed data stored in the RAM 3 of the main body is modulated by the MODEM unit 13, and transmitted to the telephone line 15 via the NCU unit 14. If a transmission destination facsimile apparatus has a JPEG expansion function, the received file can be expanded and printed out.

(f) The flow of an image signal in executing monochrome copying after the hand scanner unit 24 is mounted on the main body is the same as in (d) color copying, and a description thereof will be omitted.

(g) When monochrome photograph transmission is to be executed after the hand scanner unit 24 is mounted on the main body, compressed image data stored in the memory 62 is expanded by JPEG expansion middleware incorporated in the CPU 53, and temporarily stored in the memory 52. The CPU 53 rearranges the data, and stores data of one page in the memory 51. At this time, the CPU 53 informs the main body of completion of transfer preparation. The multilevel raw data stored in the memory 51 is parallel/serial-converted by the serial/parallel converter 56 in accordance with an XSH signal and LST signal from the main body, and supplied to the image processor 57. The image processor 57 performs, for the data, shading processing, scanner gamma conversion, and conversion of making only the resolution close to the printer resolution through printer gamma conversion. Thereafter, the image processor 57 binarizes the data to transfer the binary serial data to the main body via the selectors 60 and 59.

On the main body side, the binary data transferred via the I/F unit 21 is stored in the RAM 3. The binary data stored in the RAM 3 is modulated by the MODEM unit 13, and transmitted to the telephone line 15 via the NCU unit 14.

(h) When monochrome character copying is to be executed after the hand scanner unit 24 is mounted on the main body, MH data stored in the memory 62 is expanded by expansion middleware incorporated in the CPU 53, and stored in the memory 51. At this time, the CPU 53 informs the main body of completion of transfer preparation. The binary data stored in the memory 51 is parallel/serial-converted by the serial/parallel converter 56 in accordance with an XSH signal and LST signal from the main body, and supplied to the main body via the selector 59.

On the main body side, the image data transferred via the I/F unit 21 is stored in the RAM 3. The data stored in the RAM 3 is converted at 360 dpi as the printer resolution by the resolution converter 10, and H/V-converted by the H/V converter 11. Then, the data is converted into printing data, and printed on a printing medium by the printer 12.

(i) When monochrome character transmission is to be executed after the hand scanner unit 24 is mounted on the main body, MH data stored in the memory 62 is expanded by expansion middleware incorporated in the CPU 53, and stored in the memory 51. At this time, the CPU 53 informs the main body of completion of transfer preparation. The binary data stored in the memory 51 is parallel/serial-converted by the serial/parallel converter 56 in accordance with an XSH signal and LST signal from the main body, and supplied to the main body via the selector 59.

On the main body side, the binary data transferred via the I/F unit 21 is stored in the RAM 3. The CPU 1 encodes the binary data stored in the RAM 3 in accordance with the ability of a transmission destination facsimile apparatus. The encoded data is modulated by the MODEM unit 13, and transmitted to the telephone line 15 via the NCU unit 14.

Sheet-through Scanning

Various processes in automatically reading an original (sheet-through) while the hand scanner unit 24 is kept mounted on the main body will be briefly described with reference to FIG. 10B.

(j) When color copying is to be executed by a sheet-through read in the hand scanner unit 24, an image signal input from the CS 58 is A/D-converted, subjected to shading correction and luminance/density conversion, and then subjected to printer processing such as gamma conversion and binarization by the image processor 57. The binary serial data is transferred to the main body via the selectors 60 and 59.

(k) When color transmission is to be executed by a sheet-through read in the hand scanner unit 24, an image signal input from the CS 58 is A/D-converted and subjected to shading correction and luminance/density conversion by the image processor 57. The image signal is input as serial multilevel data to the serial/parallel converter 56 via the selector 60, and stored in the memory 51 by the DMA. Upon completion of a read of one line, the CPU 53 rearranges data stored in the memory 51, and stores them in the memory 52. The CPU 53 executes JPEG compression by the incorporated JPEG compression middleware, and stores the compressed data in the memory 62. The JPEG-compressed data stored in the memory 62 is parallel/serial-converted by the serial/parallel converter 56, and supplied to the main body via the selector 59.

The signal flows in (1) monochrome photograph copying by a sheet-through read, (m) monochrome photograph transmission by a sheet-through read, (n) monochrome character copying by a sheet-through read, and (o) monochrome character transmission by a sheet-through read are the same as in (j) color copying, and a description thereof will be omitted.

[Control Flow in CPU 1 of Main Body]

Figure 11:
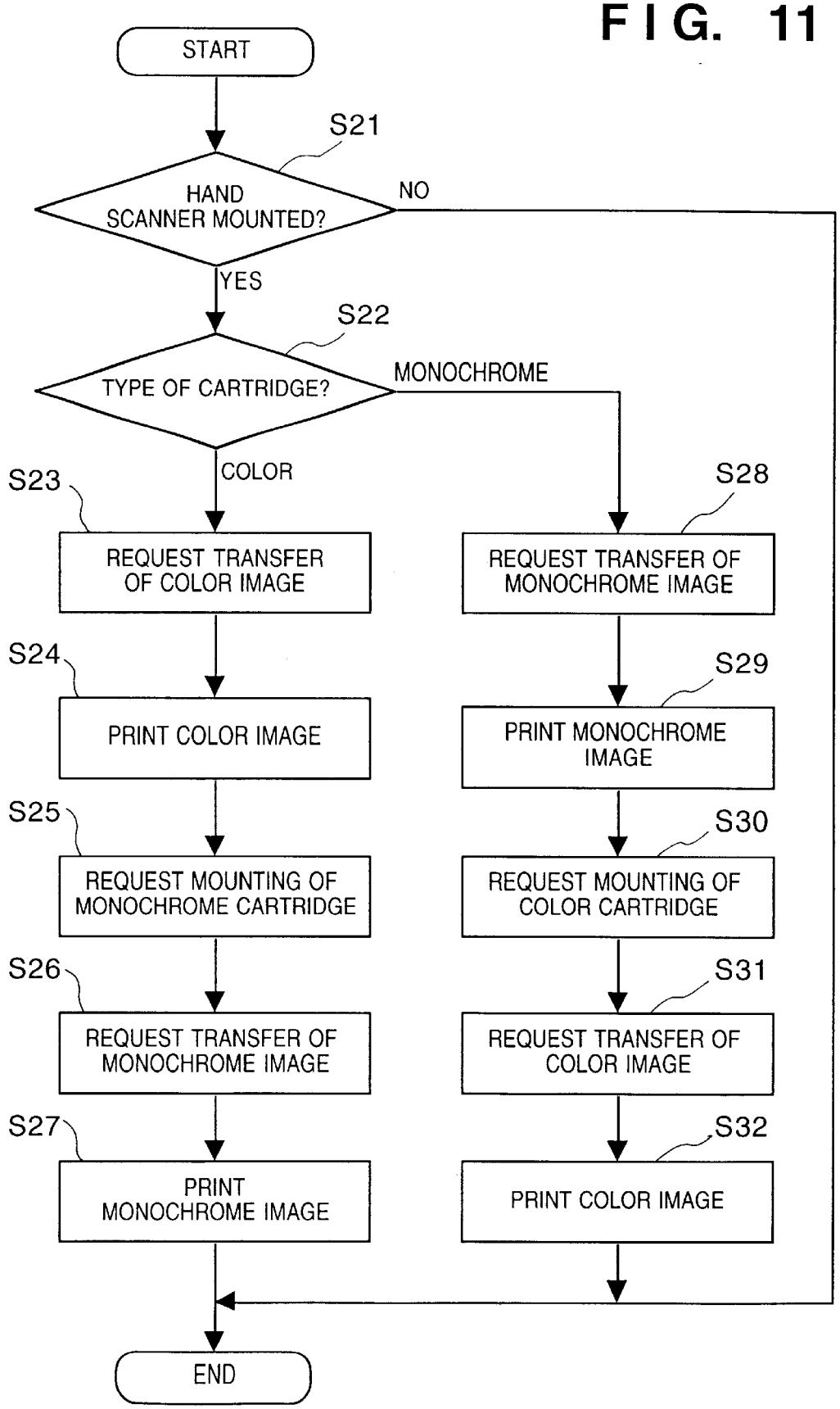
FIG. 11 is a flow chart showing control in a CPU 1 of the main body.

FIG. 11 is a flow chart showing control in the CPU 1 of the main body.

In step S21, whether the hand scanner unit 24 is mounted on the main body is detected. In step S22, the type of ink cartridge IJC mounted in the inkjet printer IJRA of the printer 12 of the main body is detected. If the ink cartridge IJC is a color cartridge, the flow advances to step S23; otherwise, to step S28.

As described above, the CPU 1 obtains image data stored in the hand scanner unit 24 upon mounting the hand scanner unit 24 on the main body. More specifically, in step S23, the CPU 1 requests the hand scanner unit 24 to transfer a color image. In step S24, the printer 12 prints out a color image based on the transferred color image data. In step S25, the display 6 displays a message of changing the ink cartridge IJC of the inkjet printer IJRA to a monochrome cartridge. If the CPU 1 detects mounting of the monochrome cartridge, it requests in step S26 the hand scanner unit 24 to transfer monochrome image data. In step S27, the printer 12 prints out a monochrome image on the basis of the transferred monochrome image data. Note that if the ink cartridge IJC is not changed and the user instructs forced printing, a monochrome image can also be printed out with the color cartridge.

If the monochrome cartridge is detected in step S22, the CPU 1 requests in step S28 the hand scanner unit 24 to transfer a monochrome image. In step S29, the printer 12 prints out a monochrome image based on the transferred monochrome image data. In step S30, the display 6 displays a message of changing the ink cartridge IJC of the inkjet printer to a color cartridge. If the CPU 1 detects mounting of the color cartridge, it requests in step S31 the hand scanner unit 24 to transfer color image data. In step S32, the printer 12 prints out a color image based on the transferred color image data. Note that if the ink cartridge IJC is not changed and the user instructs forced printing, a color image can also be printed out as a monochrome image with the monochrome cartridge.

[Scanning Order and Printing Order]

Figure 12:
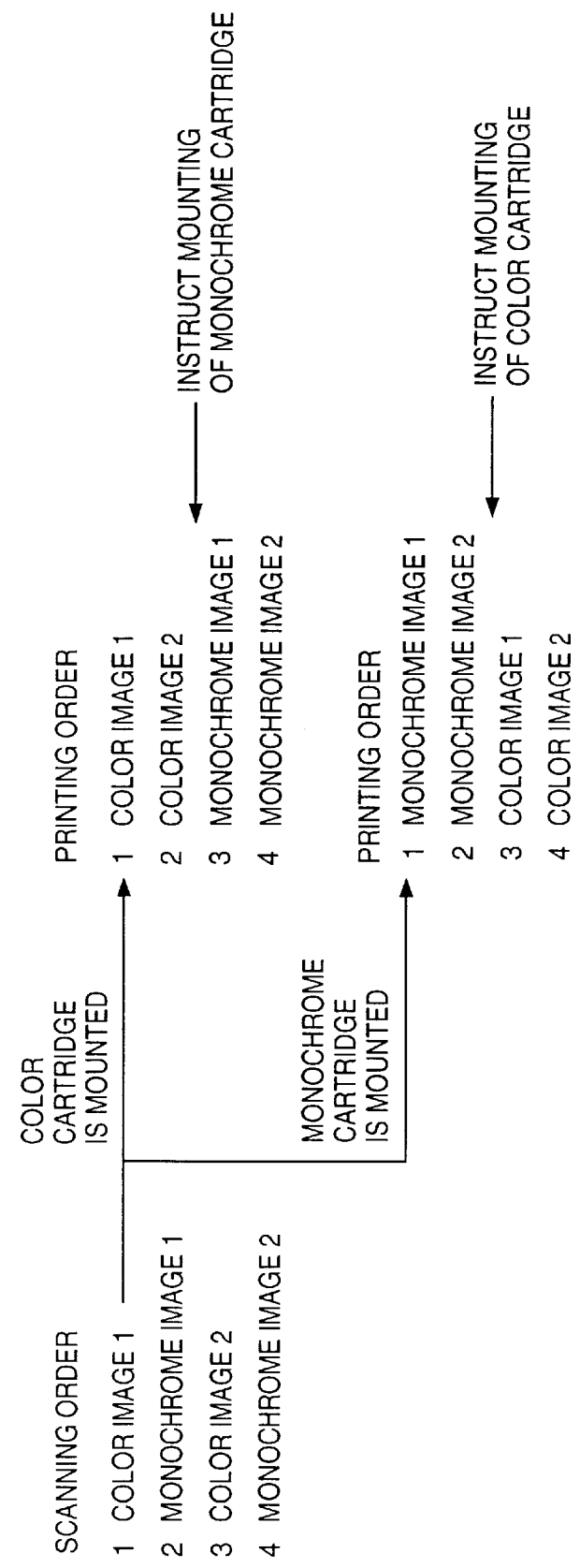
FIG. 12 is a view showing the relationship between the scanning order and printing order in the first embodiment.

FIG. 12 schematically shows the scanning order and printing order in the first embodiment.

In FIG. 12, assume that color image 1, monochrome image 1, color image 2, and monochrome image 2 are sequentially read by manually scanning the hand scanner unit 24, and stored as compressed data in the internal memory 62.

When the hand scanner unit 24 is mounted on the main body, and a color cartridge is mounted as the ink cartridge IJC of the inkjet printer IJRA in the printer 12 of the main body, data are mapped into frames first from color image storage addresses among storage locations represented by the start addresses of the respective compressed data in a memory 61 in accordance with a color image transfer request from the CPU 1. The mapped data are transmitted as printing data to the main body. That is, color image 1 and color image 2 are first transmitted as printing data. The CPU 1 displays a message of a change to a monochrome cartridge on the display 6 of the main body. After the monochrome cartridge is mounted, monochrome image 1 and monochrome image 2 are similarly transmitted as printing data from the memory 61 in the hand scanner unit 24 in accordance with a monochrome image transfer request from the CPU 1.

When a monochrome cartridge is mounted in the inkjet printer IJRA, data are mapped into frames first from monochrome image storage addresses in the memory 61 in accordance with a monochrome image transfer request from the CPU 1. The mapped data are transmitted as printing data to the main body. That is, monochrome image 1 and monochrome image 2 are first transmitted as printing data. The CPU 1 displays a message of a change to a color cartridge on the display 6 of the main body. After the color cartridge is mounted, color image 1 and color image 2 are similarly transmitted as printing data from the memory 61 in the hand scanner unit 24 in accordance with a color image transfer request from the CPU 1.

Note that the color cartridge in the first embodiment may be filled with three, C, M, and Y inks, or four, C, M, Y, and K inks. The monochrome cartridge is not limited to black ink, and may be filled with ink of one color.

According to the first embodiment, immediately when the hand scanner unit 24 which stores both read color and monochrome images is mounted on the main body, a scanned image can be printed without changing the ink cartridge currently mounted in the printer.

Since monochrome printing by a color cartridge can be avoided, the use efficiency of the color cartridge can be increased.

Further, all scanned images can be forcibly printed out with a currently mounted cartridge regardless of the ink color.

Second Embodiment

The second embodiment according to the present invention will be described.

In the first embodiment, as shown in the flow chart of FIG. 11, the CPU 1 of the main body detects the type of ink cartridge IJC of the inkjet printer IJRA in the facsimile apparatus main body, and requests the hand scanner unit 24 to request transfer of an image corresponding to the type of cartridge. In the second embodiment, the image transfer order corresponding to the type of cartridge is controlled by a CPU 53 of a hand scanner unit 24.

The arrangement of the facsimile apparatus in the second embodiment is the same as in the first embodiment, and a description thereof will be omitted. Control of the second embodiment different from that of the first embodiment will be described.

[Interface Between Main Body and Unit]

Communication between the hand scanner unit 24 and main body after the hand scanner unit 24 is mounted on the main body will be explained. When the hand scanner unit 24 is mounted on the main body, a CPU 1 of the main body and the CPU 53 of the hand scanner unit 24 detect mounting of the hand scanner unit 24. Then, the CPU 53 of the hand scanner unit 24 issues to the CPU 1 of the main body via a UART 54 a command of inquiring the type of ink cartridge IJC mounted in an inkjet printer IJRA, and receives the response. The CPU 53 further receives designation of an image file to be processed and a copying or transmission request from an operation unit 7 of the main body via the UART 54, and determines an image to be transferred to the main body and the transfer order. The CPU 53 maps image data of the designated file into transfer data in accordance with the transfer order, and informs the main body after mapping.

Signals exchanged on the UART 54 in the second embodiment will be described. Upon turning on the main body, the CPU 1 of the main body issues a reset command and initialization command for an image processor 57 in the hand scanner unit 24.

When the hand scanner unit 24 is mounted on the main body, the CPU 53 of the hand scanner unit 24 issues a command of inquiring the type of cartridge on the inkjet printer IJRA of the main body to receive the response from the main body.

When a user designates a stored-data file and page in the hand scanner unit 24 via the operation unit 7, and requests copying or transmission, the CPU 53 receives the request to determine a transfer file, and issues a copying or transmission command to the main body. The CPU 1 of the main body responds "OK", and then the CPU 53 starts transfer operation.

For example, when a JPEG-compressed color image is stored in the hand scanner unit 24 by manual scanning, the CPU 53 can also transmit the color image by changing the compression method so as to convert the color image by, e.g., a DPCM compression method in accordance with the ability of a transmission destination apparatus.

Note that signals on the UART 54 in a sheet-through read are the same as those in the first embodiment.

[Control Flow in CPU 53 of Unit]

Figure 13:
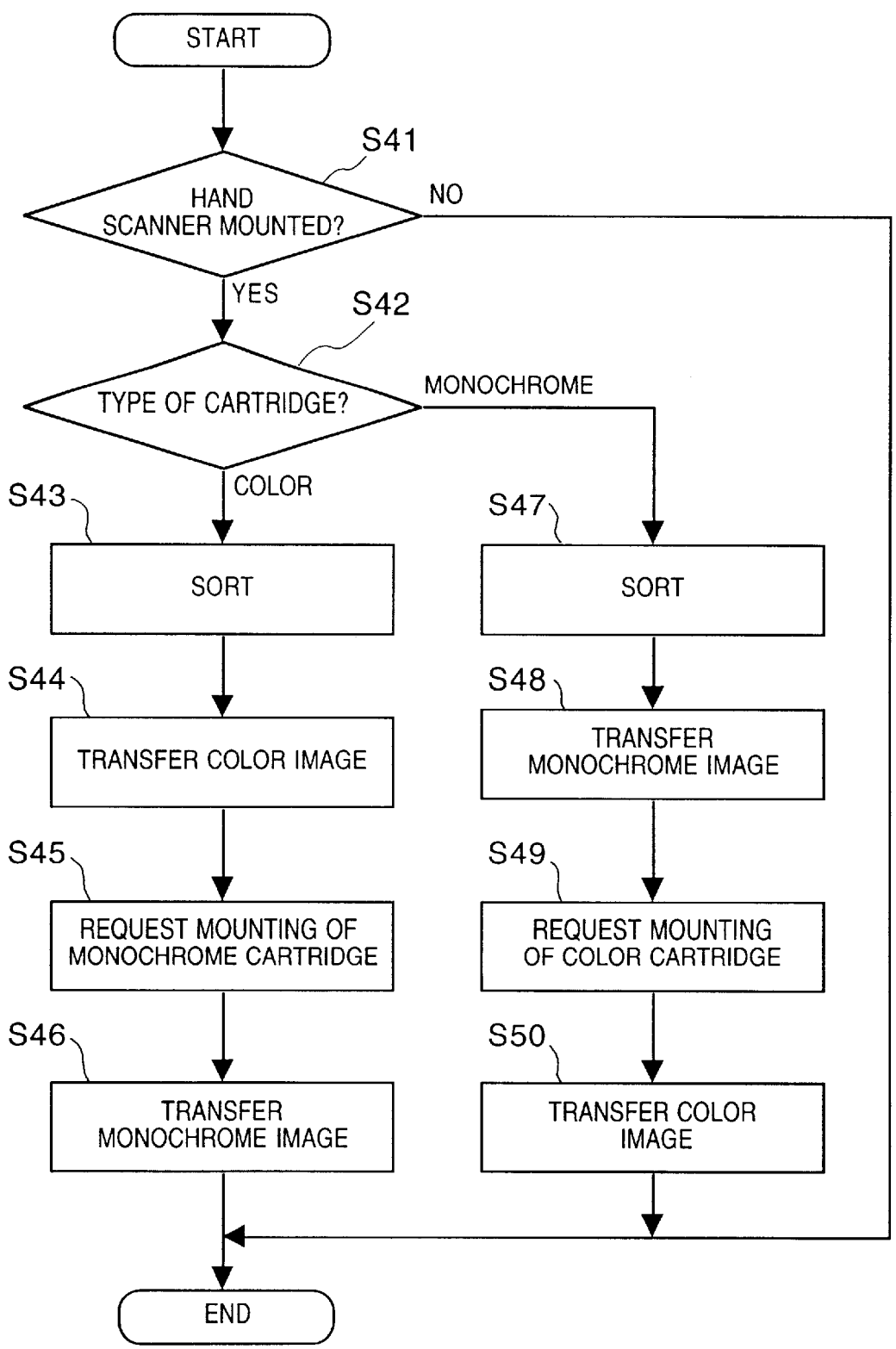
FIG. 13 is a flow chart showing control in a CPU 53 of the hand scanner unit according to the second embodiment of the present invention.

FIG. 13 is a flow chart showing control in the CPU 53 of the hand scanner unit 24 in the second embodiment.

In step S41, whether the hand scanner unit 24 is mounted on the main body is detected. In step S42, the type of ink cartridge IJC mounted in the inkjet printer IJRA of the printer 12 of the main body is detected, as described above. If the ink cartridge IJC is a color cartridge, the flow advances to step S43; otherwise, to step S47.

The CPU 53 sorts stored images in the printing order in step S43, and transfers only color images to the main body in step S44. In step S45, the CPU 53 informs the CPU 1 that a display 6 is caused to display a message of changing the ink cartridge IJC of the inkjet printer IJRA to a monochrome cartridge. In step S46, if the CPU 53 detects mounting of the monochrome cartridge, the CPU 53 transfers monochrome image data. Note that if the ink cartridge IJC is not changed and the user instructs forced printing, a monochrome image can also be printed out with the color cartridge.

If the monochrome cartridge is detected in step S42, the CPU 53 sorts stored images in the printing order in step S47, and transfers only monochrome images to the main body in step S48. In step S49, the CPU 53 informs the CPU 1 that the display 6 is caused to display a message of changing the ink cartridge IJC of the inkjet printer IJRA to a color cartridge. In step S50, if the CPU 53 detects mounting of the color cartridge, the CPU 53 transfers color image data. Note that if the ink cartridge IJC is not changed and the user instructs forced printing, a color image can also be printed out as a monochrome image with the monochrome cartridge.

According to the second embodiment as well as the first embodiment, immediately when the hand scanner unit 24 which stores both color and monochrome images is mounted on the main body, a scanned image can be printed without changing the ink cartridge currently mounted in the printer.

Moreover, a scanned image can be printed out regardless of the type of ink cartridge.

Other Embodiments

The present invention may be applied to a system constituted by a plurality of devices (e.g., a host computer, interface device, reader, and printer) or an apparatus comprising a single device (e.g., a copying machine or facsimile apparatus).

The printer 12 is not necessarily limited to the inkjet type, and may be of another type using a color/monochrome printing unit.

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to this storage medium, the storage medium stores program codes corresponding to the above-described flow charts.

As has been described above, according to the present invention, when a detachable image reader can scan both color and monochrome images, these images can be efficiently printed out regardless of the type of printing agent cartridge mounted in a main body printer.

The frequency of exchanging the printing agent cartridge can be minimized.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus having image reading means for reading an image by a detachable reading unit, and image printing means for printing out the image read by said image reading means onto a printing medium, comprising:

printing agent detecting means for detecting information relating to printing agent used in said image printing means; and control means for controlling transfer of the image read by said image reading means to said image printing means in accordance with the information relating to printing agent.

2. The apparatus according to claim 1, wherein said image processing apparatus further comprises mounting detecting means for detecting mounting of the reading unit on a main body of said image processing apparatus, and said control means controls transfer of the image read by said image reading means when said mounting detecting means detects mounting of the reading unit.

3. The apparatus according to claim 1, wherein said printing agent detecting means detects printing agent color information used in said image printing means.

4. The apparatus according to claim 1, wherein said printing agent detecting means detects printing agent cartridge information mounted in said image printing means.

5. The apparatus according to claim 4, wherein said printing agent detecting means detects whether a printing agent cartridge mounted in said image printing means is a color or monochrome cartridge.

6. The apparatus according to claim 1, wherein said control means controls a data transfer order from said image reading means in accordance with printing agent information detected by said printing agent detecting means.

7. The apparatus according to claim 6, wherein said control means controls said image reading means to preferentially transfer image data corresponding to the printing agent information detected by said printing agent detecting means.

8. The apparatus according to claim 1, further comprising informing means for instructing a change of a printing agent used in said image printing means in accordance with data transfer in said image reading means.

9. The apparatus according to claim 8, wherein after image data corresponding to a first printing agent that is detected by said printing agent detecting means is printed by said image printing means, said informing means instructs a change to a second printing agent.

10. The apparatus according to claim 9, wherein when the second printing agent is detected by said printing agent detecting means after said informing means instructs a change of the printing agent, said control means controls to transfer image data corresponding to the second printing agent.

11. The apparatus according to claim 9, wherein the first and second printing agents are color and black printing agents, respectively.

12. The apparatus according to claim 9, wherein the first and second printing agents are black and color printing agents, respectively.

13. The apparatus according to claim 1, wherein the reading unit comprises compressing means for compressing and expanding image data.

14. The apparatus according to claim 1, wherein the reading unit comprises holding means for holding a plurality of read image data.

15. The apparatus according to claim 1, wherein information is transmitted by a UART between the reading unit and said control means.

16. The apparatus according to claim 1, further comprising communicating means for communicating image data with another apparatus connected via a telephone line.

17. The apparatus according to claim 1, wherein the reading unit is a hand scanner.

18. The apparatus according to claim 1, wherein said image printing means comprises a printhead for discharging ink to print.

19. The apparatus according to claim 18, wherein the printhead discharges ink using heat energy, and comprises a heat energy converter for generating heat energy applied to ink.

20. An image processing apparatus comprising image reading means for reading an image by a detachable reading unit, and image printing means for printing out the transferred image read by said image reading means onto a printing medium, said image reading means having:
printing agent detecting means for detecting information relating to printing agent used in said image printing means; and control means for controlling image transfer to said image printing means in accordance with the information relating to printing agent detected by said printing agent detecting means.

21. The apparatus according to claim 20, wherein said image reading means further comprises mounting detecting means for detecting mounting of the reading unit, and
said control means controls image transfer when said mounting detecting means detects mounting of the reading unit.

22. The apparatus according to claim 20, wherein said printing agent detecting means detects printing agent color information used in said image printing means.

23. The apparatus according to claim 20, wherein said printing agent detecting means detects printing agent cartridge information mounted in said image printing means.

24. The apparatus according to claim 23, wherein said printing agent detecting means detects whether a printing agent cartridge mounted in said image printing means is a color or monochrome cartridge.

25. The apparatus according to claim 20, wherein said control means controls a data transfer order in said image reading means in accordance with printing agent information detected by said printing agent detecting means.

26. The apparatus according to claim 25, wherein said control means controls said image reading means to preferentially transfer image data corresponding to the printing agent information detected by said printing agent detecting means.

27. The apparatus according to claim 20, further comprising informing means for instructing a change of a printing agent used in said image printing means in accordance with data transfer in said image reading means.

28. The apparatus according to claim 27, wherein after image data corresponding to a first printing agent that is detected by said printing agent detecting means is printed by said image printing means, said informing means instructs a change to a second printing agent.

29. The apparatus according to claim 28, wherein when the second printing agent is detected by said printing agent detecting means after said informing means instructs a change of the printing agent, said control means controls to transfer image data corresponding to the second printing agent.

30. The apparatus according to claim 28, wherein the first and second printing agents are color and black printing agents, respectively.

31. The apparatus according to claim 28, wherein the first and second printing agents are black and color printing agents, respectively.

32. The apparatus according to claim 20, wherein said image reading means comprises, in the reading unit, compressing means for compressing and expanding image data.

33. The apparatus according to claim 20, wherein the reading unit comprises holding means for holding a plurality of read image data.

34. The apparatus according to claim 20, wherein information is transmitted by a UART between said control means and said image printing means.

35. The apparatus according to claim 20, further comprising communicating means for communicating image data with another apparatus connected via a telephone line.

36. The apparatus according to claim 20, wherein said image reading means is a hand scanner.

37. The apparatus according to claim 20, wherein said image printing means comprises A printhead for discharging ink to print.

38. The apparatus according to claim 37, wherein the printhead discharges ink using heat energy, and comprises a heat energy converter for generating heat energy applied to ink.

39. An image processing method in an image processing apparatus having image reading means for reading an image by a detachable reading unit, and image printing means for printing out the image read by the image reading means onto a printing medium, comprising the steps of:

detecting information relating to printing agent used in the image printing means; and controlling transfer of the image read by the image reading means to the image printing means in accordance with the information relating to printing agent.

40. A recording medium which records an image processing program code in an image processing method in an image processing apparatus having image reading means for reading an image by a detachable reading unit, and image printing means for printing out the image read by the image reading means onto a printing medium, the program code comprising codes of:

the step of detecting information relating to printing agent used in the image printing means; and the step of controlling transfer of the image read by the image reading means to the image printing means in accordance with the information relating to printing agent.

* * * * *